(12) United States Patent
Bandholz et al.

(10) Patent No.: US 7,906,950 B2
(45) Date of Patent: Mar. 15, 2011

(54) TUNING A SWITCHING POWER SUPPLY

(75) Inventors: Justin P. Bandholz, Cary, NC (US);
Nickolas J. Gruendler, Pflugerville, TX
(US); Pravin Patel, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 293 days.

(21) Appl. No.: 12/270,477

(22) Filed: Nov. 13, 2008

(65) Prior Publication Data
US 2010/0117614 A1 May 13, 2010

(51) Int. Cl.
*G05F 1/00* (2006.01)
*G05D 17/00* (2006.01)
(52) U.S. Cl. ......................... 323/283; 700/298
(58) Field of Classification Search .......... 323/282–283;
708/300; 333/17.3, 32, 33; 702/65; 700/297, 700/298
See application file for complete search history.

(56) References Cited

U.S. PATENT DOCUMENTS

| | | | |
|---|---|---|---|
| 4,425,612 A | 1/1984 | Bahler et al. | |
| 4,950,994 A | 8/1990 | Glover et al. | |
| 6,735,302 B1 * | 5/2004 | Caine et al. | 379/405 |
| 7,301,366 B1 * | 11/2007 | Devnath et al. | 326/30 |
| 7,538,535 B2 * | 5/2009 | McDonald et al. | 323/288 |
| 2004/0017921 A1 * | 1/2004 | Mantovani | 381/94.9 |
| 2007/0085521 A1 * | 4/2007 | Nagai | 323/283 |

FOREIGN PATENT DOCUMENTS

| | | |
|---|---|---|
| EP | 0 332 383 A2 | 9/1989 |
| EP | 0 332 383 B2 | 9/1989 |

OTHER PUBLICATIONS

PEPA; Adaptive Control Of A Step-Up Full-Bridge DC-DC Converter For Variable Low Input Voltage Applications; 2004; pp. 1-94; Blacksburg, Virginia.

* cited by examiner

*Primary Examiner* — Gary L Laxton
*Assistant Examiner* — Jeffrey Gblende
(74) *Attorney, Agent, or Firm* — Brandon C. Kennedy; Cynthia G. Seal; Biggers & Ohanian, LLP.

(57) ABSTRACT

Tuning a switching power supply, the power supply including a switching transistor; a filter circuit; a pulse generator that drives the switching transistor; a programmable filter connected to the output of the filter circuit; a digital signal processor ('DSP') connected to the output of the filter circuit, the DSP configured to program the programmable filter; and a tuning control circuit connected to the output of the filter circuit, to the pulse generator, and to the DSP; including calculating by the DSP, from sampled voltage values of a tuning pulse driven through the filter circuit by the pulse generator, the actual impedance of the filter circuit; and programming, by the DSP, the programmable filter, setting the combined impedance of the filter circuit and the programmable filter to the design impedance of the filter circuit.

17 Claims, 4 Drawing Sheets

TUNING A SWITCHING POWER SUPPLY

BACKGROUND OF THE INVENTION

1. Field of the Invention

The field of the invention is electrical power supply, or, more specifically, methods, apparatus, and products for tuning a switching power supply.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

One of the areas that has seen considerable improvement is power supply. Contemporary switching power supplies, however, require the designer to pre-calculate and select operating parameters such as filter impedance, filter bandwidth, filter poles locations, switching frequency, and the like, based on the selected output filter network. Part tolerances often cause the calculations to be sub-optimal for real circuits, and part values changes in the wear and tear of power supply operations over time with no way in the current art to compensate for such changes.

SUMMARY OF THE INVENTION

Methods, apparatus, and products for tuning a switching power supply, where the power supply includes at least one switching transistor; a filter circuit disposed between the switching transistor and the output of the power supply, the filter circuit having a design impedance; a pulse generator that drives the switching transistor; a programmable filter connected to the output of the filter circuit; a digital signal processor ('DSP') connected to the output of the filter circuit, the DSP configured to program the programmable filter; and a tuning control circuit connected to the output of the filter circuit, to the pulse generator, and to the DSP; including calculating by the DSP, from sampled voltage values of a tuning pulse driven through the filter circuit by the pulse generator, the actual impedance of the filter circuit; and programming, by the DSP, the programmable filter, setting the combined impedance of the filter circuit and the programmable filter to the design impedance of the filter circuit.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
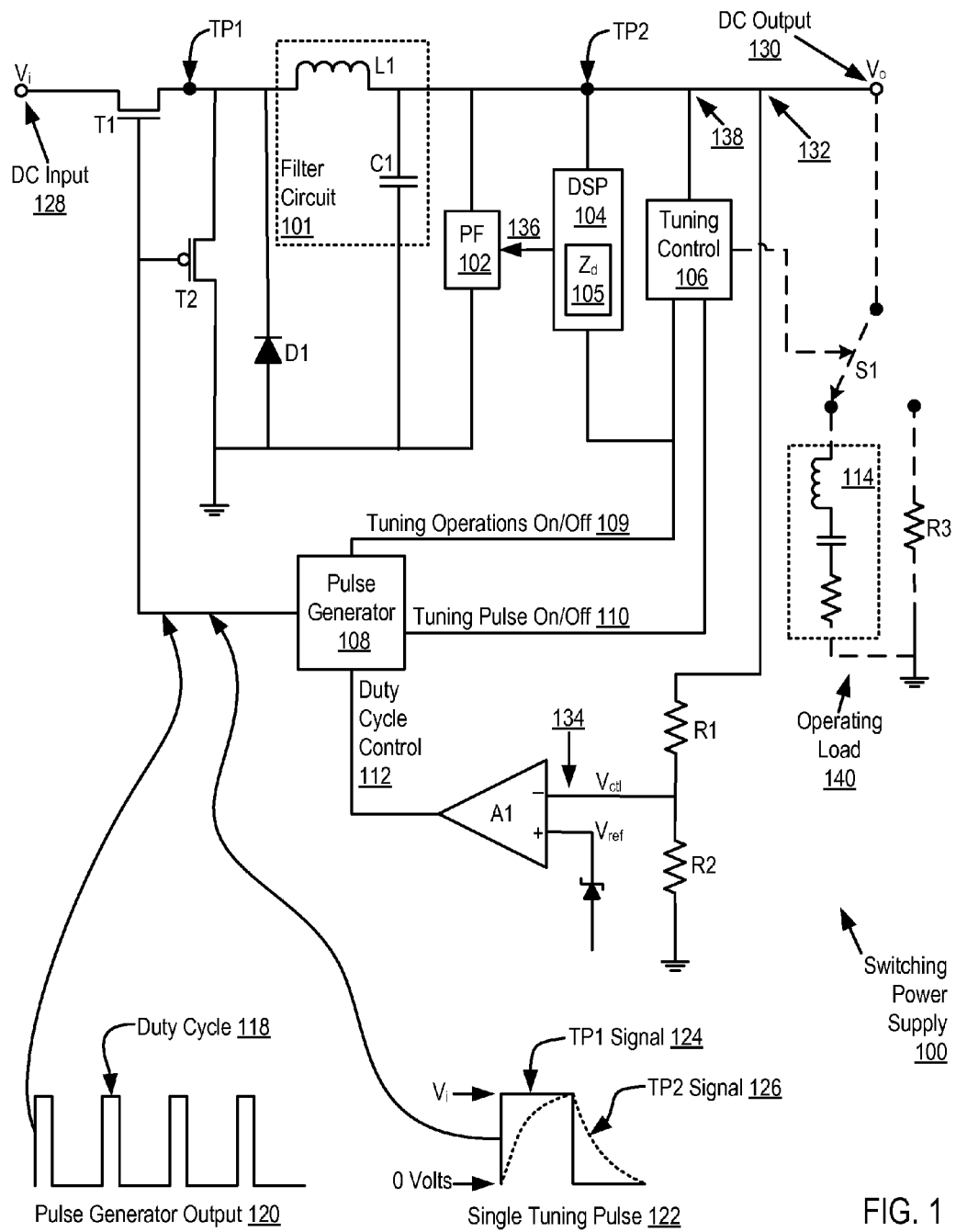
FIG. 1 sets forth a schematic diagram of apparatus for tuning a switching power supply according to embodiments of the present invention.

Exemplary methods, apparatus, and products for tuning a switching power supply in accordance with the present invention are described with reference to the accompanying drawings, beginning with FIG. 1. FIG. 1 sets forth a schematic diagram of apparatus for tuning a switching power supply according to embodiments of the present invention. The apparatus of FIG. 1 implements a switching power supply (100) improved to support tuning according to embodiments of the present invention. The power supply (100) in the example of FIG. 1 is of the kind known variously as a 'DC to DC step down switch mode power supply,' a 'buck converter,' or a 'switch mode regulator,' although, for ease of explanation, this type of power supply is referred to in this specification as a 'switching power supply.'

The power supply (100) of FIG. 1 is a 'switching' power supply in that it achieves voltage regulation on its output (130) during normal operation by switching its input voltage (128) through switching transistors T1, T2, switching diode D1, and a filter circuit (101), effecting the switching by driving the switching transistors with a pulse stream (120) from a pulse generator (108). In this example, the filter circuit, disposed between the switching transistors T1, T2 and the output (130) of the power supply, is an LC circuit composed of filter inductor L1 and filter capacitor C1, although other configurations of the filter circuit are possible—as will occur to those of skill in the art. The filter circuit (101) is designed to smooth the pulse stream (120) into the direct current ('DC') output of the power supply, and, in order to do so, the filter circuit is designed to have a particular bandwidth characterized by a particular electrical impedance which is referred to in this specification as the 'design impedance' of the filter circuit. The design impedance is distinguished from the actual impedance of the filter circuit because parts used to construct an actual circuit have tolerances from their design values and also because the actual values of inductance or capacitance in the parts will vary over time as the parts age in actual use.

The pulses in the pulse stream (120) have a characteristic duty cycle (118) defined as the proportion of each individual pulse during which the pulse signal is on. The pulse is measured as a number between 0 and 1, representing the portion of the total period of a pulse when the pulse signal is on. The value of the regulated voltage on the output (130) of the power supply then is expressed as:

$$V_o = DV_i,$$

where $V_o$ is the output voltage, $V_i$ is the input voltage, and D is the duty cycle. In application therefore, for example, when $V_i=12$ volts and $D=0.25$, then $V_o=3$ volts. In this example, the pulse generator (108) accepts voltage control of its duty cycle on duty cycle control line (112), and control amplifier A1 provides closed loop control of the output voltage $V_o$ by setting the duty cycle to lock the voltage on the amplifier's control input $V_{ctl}$ to a reference voltage $V_{ref}$. The resistor network R1, R2 steps down the output voltage $V_o$ to the reference voltage, optionally when the output voltage $V_o$ is greater than the reference voltage $V_{ref}$. When the reference voltage Vref and the output voltage $V_o$ are the same, then the resistor network is not needed, and the control input (134) of the amplifier A1 is connected (132) directly to the output line of the power supply.

The power supply (100) of FIG. 1 includes a programmable filter (102) connected to the output side of the filter circuit (101) and a digital signal processor ('DSP') (104) connected to the output of the filter circuit. The DSP is configured to program the programmable filter, connected (136) to one or more programming inputs of the DSP. In this example, the DSP (104) also is configured with the design impedance $Z_i$ (105) of the filter circuit (101). The DSP is a kind of small computer in itself, with internal information storage capacity in which is stored a specification of the design impedance of the filter circuit, optionally including such characteristic information as the design bandwidth of the filter circuit, its half power bandwidth frequencies, filter pole and zero frequencies, and so on. The design impedance can be specified in polar form with a resultant value and an angle, as a combination of a real value and an imaginary component, and so on, as will occur to those of skill in the art. Configuring the DSP with the design impedance of the filter circuit may be carried out during manufacture of the power supply and left unchanged during the operational life of the power supply. Alternatively, the configuration of the DSP with the design impedance can be updated by data input to the DSP periodically during the life of the power supply so that, for example, the design impedance of the filter circuit can be changed during the operational life of the power supply.

The power supply (100) also includes a tuning control circuit (106) which is also connected to the output of the filter circuit (101). In addition, through tuning operations control line (109), the tuning control circuit is also connected to the pulse generator (108) and to the DSP (104). The tuning control circuit is composed of synchronous and asynchronous logic circuitry configured to carry out overall control of the process of tuning a switching power supply. The tuning control circuit may be implemented as an application specific integrated circuit ('ASIC'), as programmable array logic ('PAL'), as a field programmable gate array ('FPGA'), as a complex programmable logic device ('CPLD'), as an embedded microcontroller with a control program stored in a Harvard architecture, as a microprocessor with a control program stored in non-volatile computer memory, and in other ways that may occur to those of skill in the art. To the extent that the tuning control circuit is implemented as PAL, ASIC, FPGA, CPLD, and the like, its functions can be specified in a hardware description language such as Verilog or in the very high speed integrated circuit design description language ('VHDL'). Such specifications of the tuning control circuit in hardware description languages may be embodied in computer program products—as can control programs for microcontrollers or microprocessors written in machine language, assembler, or in other programming languages as will occur to those of skill in the art.

The components of the switching power supply (100) cooperate to tune the switching power supply under the overall control of the tuning control circuit (106). The power supply is tuned by use of a tuning pulse (122) that is provided by the pulse generator (108) under control of the tuning control circuit (106). The tuning control circuit enables a tuning pulse from the pulse generator by activating the tuning operations control line (109). Enabling the tuning operations control line (109) instructs the pulse generator to cease streaming its normal pulse output (120) and drive its output only as instructed by the tuning pulse input (110) to the pulse generator (108). The tuning control circuit turns off the tuning pulse by disabling the tuning pulse control line (110), thereby preparing the filter circuit to receive a tuning pulse by driving the voltage at test point TP1, the input to the tuning circuit (101), as well as the voltage at test point TP2 on the output of the filter circuit, to ground, zero volts.

The tuning control circuit turns on the tuning pulse by enabling the tuning pulse control line (110), driving the TP1 signal (124) to $V_i$. Turning on the turning pulse also drives the tuning pulse through the switching transistor into and through the filter circuit raising the voltage at test point TP2 on the output of the filter circuit to $V_i$, although, due to the actual impedance of the filter circuit, the voltage of the TP2 signal (126) rises at a slower rate than the TP1 signal. Enabling the tuning pulse control line (110) also enables DSP sampling, instructing the DSP to begin sampling the tuning pulse as it arrives at TP2 as output from the filter circuit.

The tuning control circuit (106), through its connection (138) to the output of the filter circuit, detects when the tuning pulse voltage output from the filter circuit is equal to the voltage input to the filter circuit, $V_i$. When the tuning pulse voltage output from the filter circuit is equal to the voltage input to the filter circuit, $V_i$, the tuning control circuit turns off the tuning pulse by disabling the tuning pulse control line (110), thereby driving TP1 again to ground and eventually driving TP2 to ground also. DSP sampling continues, however, until the tuning pulse output from the filter circuit at TP2 returns to zero volts. The tuning control circuit detects when the voltage output from the filter circuit is equal to zero volts and then disables DSP sampling and also disables the tuning pulse from the pulse generator by disabling the tuning operations control line (109).

Disabling DSP sampling instructs to calculate, from its sampled voltage values of the tuning pulse driven through the filter circuit by the pulse generator, the actual impedance of the filter circuit. After calculating the actual impedance of the filter circuit, the DSP derives a tuning impedance for the programmable filter by use of the actual impedance of the filter circuit, just derived, and the design impedance of the filter circuit, $Z_d$. The tuning impedance is an impedance which, when combined with the impedance of the filter circuit, will set the combined impedance of the filter circuit and the programmable filter to the design impedance of the filter circuit. After deriving the tuning impedance, the DSP then programs the programmable filter with the tuning impedance, thereby setting the combined impedance of the filter circuit and the programmable filter to the design impedance of the filter circuit.

For tuning operations, a purely resistive operating load is preferred for the power supply, such as, for example, R3. It is possible, however, that the operating load of the power supply presents a complex impedance, such as, for example, the complex RLC load presented by load circuit (114). In the example of FIG. 1, therefore, the tuning control circuit (106) is operably connected to a switch, S1, that is connected in series with the operating load 140, and the tuning control circuit can switch the operating load (140) to a resistive tuning load, R3, before tuning the power supply.

The arrangement of electronic components and other devices making up the example power supply (100) illustrated in FIG. 1 are for explanation, not for limitation. Power supplies capable of being tuned according to various embodiments of the present invention may include additional switches, transistors, diode, amplifiers, control circuitry, and other devices, not shown in FIG. 1, as will occur to those of skill in the art. Various embodiments of the present invention may be implemented in a variety of hardware configurations and with various forms of software in addition to those illustrated and described in the example of FIG. 1.

Figure 2:
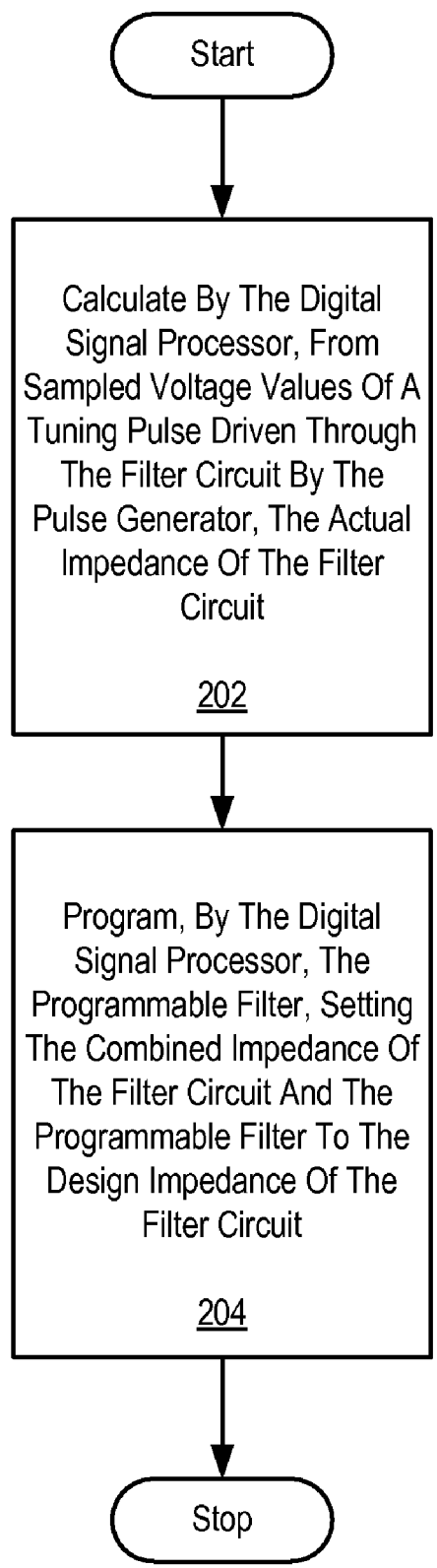
FIG. 2 sets forth a flow chart illustrating an example method for tuning a switching power supply according to embodiments of the present invention.

For further explanation, FIG. 2 sets forth a flow chart illustrating an example method for tuning a switching power supply according to embodiments of the present invention. The method of FIG. 2 is explained with reference both to FIG. 2 and also to FIG. 1. The method of FIG. 2 is implemented in apparatus similar to that illustrated in FIG. 1, a switching power supply (100) that includes at least one switching transistor (T1), with a filter circuit (101) disposed between the switching transistor and the output (130) of the power supply, where the filter circuit has a design impedance. A pulse generator (108) drives the switching transistor, and a programmable filter (102) is connected to the output of the filter circuit. A digital signal processor ('DSP') (104) is connected to the output of the filter circuit, and the digital signal processor is configured to program the programmable filter. A tuning control circuit (106) is connected to the output of the filter circuit, to the pulse generator, and to the digital signal processor. The method of FIG. 2 includes calculating (202) by the DSP (104), from sampled voltage values of a tuning pulse (122) driven through the filter circuit (101) by the pulse generator (108), the actual impedance of the filter circuit. The method of FIG. 2 also includes programming (204), by the DSP (104), the programmable filter (102), setting the combined impedance of the filter circuit and the programmable filter to the design impedance of the filter circuit.

Figure 3:
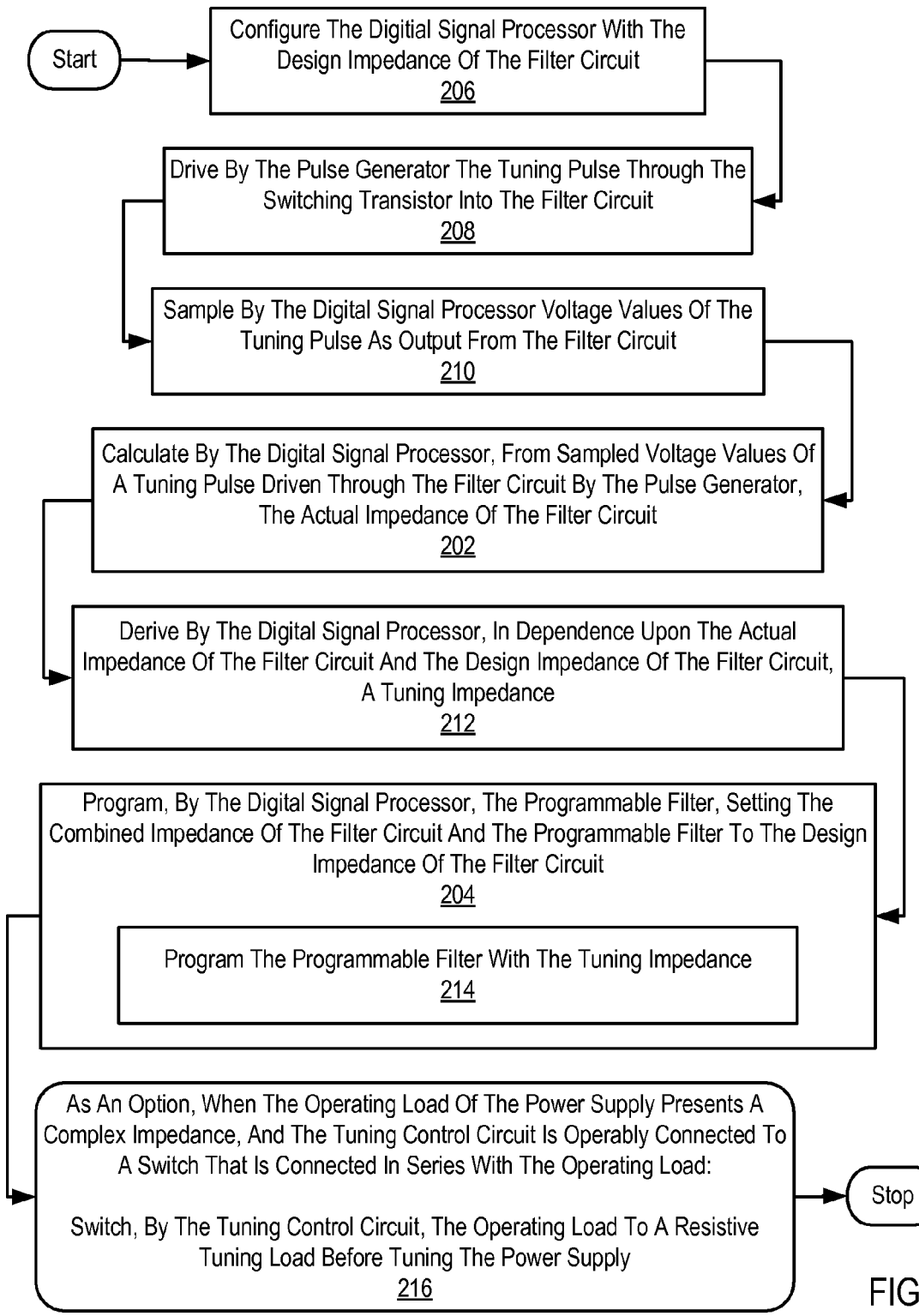
FIG. 3 sets forth a flow chart illustrating a further example method for tuning a switching power supply according to embodiments of the present invention.

For further explanation, FIG. 3 sets forth a flow chart illustrating a further example method for tuning a switching power supply according to embodiments of the present invention. The method of FIG. 3 is explained with reference both to FIG. 3 and also to FIG. 1. The method of FIG. 3 is similar to the method of FIG. 2. The method of FIG. 3, like the method of FIG. 2, is implemented in apparatus similar to that illustrated in FIG. 1, a switching power supply (100) that includes at least one switching transistor (T1), with a filter circuit (101) disposed between the switching transistor and the output (130) of the power supply, where the filter circuit has a design impedance. A pulse generator (108) drives the switching transistor, and a programmable filter (102) is connected to the output of the filter circuit. A digital signal processor ('DSP') (104) is connected to the output of the filter circuit, and the digital signal processor is configured to program the programmable filter. A tuning control circuit (106) is connected to the output of the filter circuit, to the pulse generator, and to the digital signal processor. The method of FIG. 3, like the method of FIG. 2, includes calculating (202) by the DSP (104), from sampled voltage values of a tuning pulse (122) driven through the filter circuit (101) by the pulse generator (108), the actual impedance of the filter circuit. The method of FIG. 3 also includes programming (204), by the DSP (104), the programmable filter (102), setting the combined impedance of the filter circuit and the programmable filter to the design impedance of the filter circuit.

In addition to the steps of calculating (202) the actual impedance of the filter circuit and programming (204) the programmable filter (102), the method of FIG. 3 also includes configuring (202) the digital signal processor with the design impedance of the filter circuit. Configuring (202) the digital signal processor with the design impedance of the filter circuit can be carried out by storing the design impedance in non-volatile memory inside the DSP itself, either at the time of manufacture, by manual data entry at any time during the life of the power supply, and in other ways that will occur to those of skill in the art.

The method of FIG. 3 also includes the pulse generator's driving (206) the tuning pulse through the switching transistor into the filter circuit. The tuning pulse (122) enters the filter circuit at TP1 in the form shown at reference (124) and emerges from the filter circuit at TP2 in the form shown at reference (126). The method of FIG. 3 also includes the DSP's sampling (208) the voltage values of the tuning pulse as output from the filter circuit, with the sampling carried out at some predetermined sampling rate, resulting in a number of sampled values which, taken together, represent the shape of the tuning pulse (126) on the output of the filter circuit at TP2. The method of FIG. 3 also includes the DSP's deriving (212) in dependence upon the actual impedance of the filter circuit (101) and the design impedance of the filter circuit, a tuning impedance. The DSP may, for example, derive the tuning impedance by subtracting the actual impedance of the filter circuit from the design impedance of the filter circuit. In the method of FIG. 3, programming (204) the programmable filter includes programming (214) the programmable filter with the tuning impedance, the tuning impedance being an impedance which, when combined with the impedance of the filter circuit, sets the combined impedance of the filter circuit (101) and the programmable filter (102) to the design impedance of the filter circuit.

As mentioned above, tuning operations, a purely resistive operating load is preferred for tuning operations in the power supply. It is possible, however, that the operating load of the power supply presents a complex impedance, such as, for example, the complex RLC load presented by load circuit (114). In the example of FIG. 1, therefore, the tuning control circuit (106) is operably connected to a switch, S1, with the switch connected in series with the operating load 140, and the method of FIG. 3 includes the optional step, useful in the presence of complex operating loads, of the tuning control circuit's switching (216) the operating load (140) to a resistive tuning load, R3, before tuning the power supply.

Figure 4:
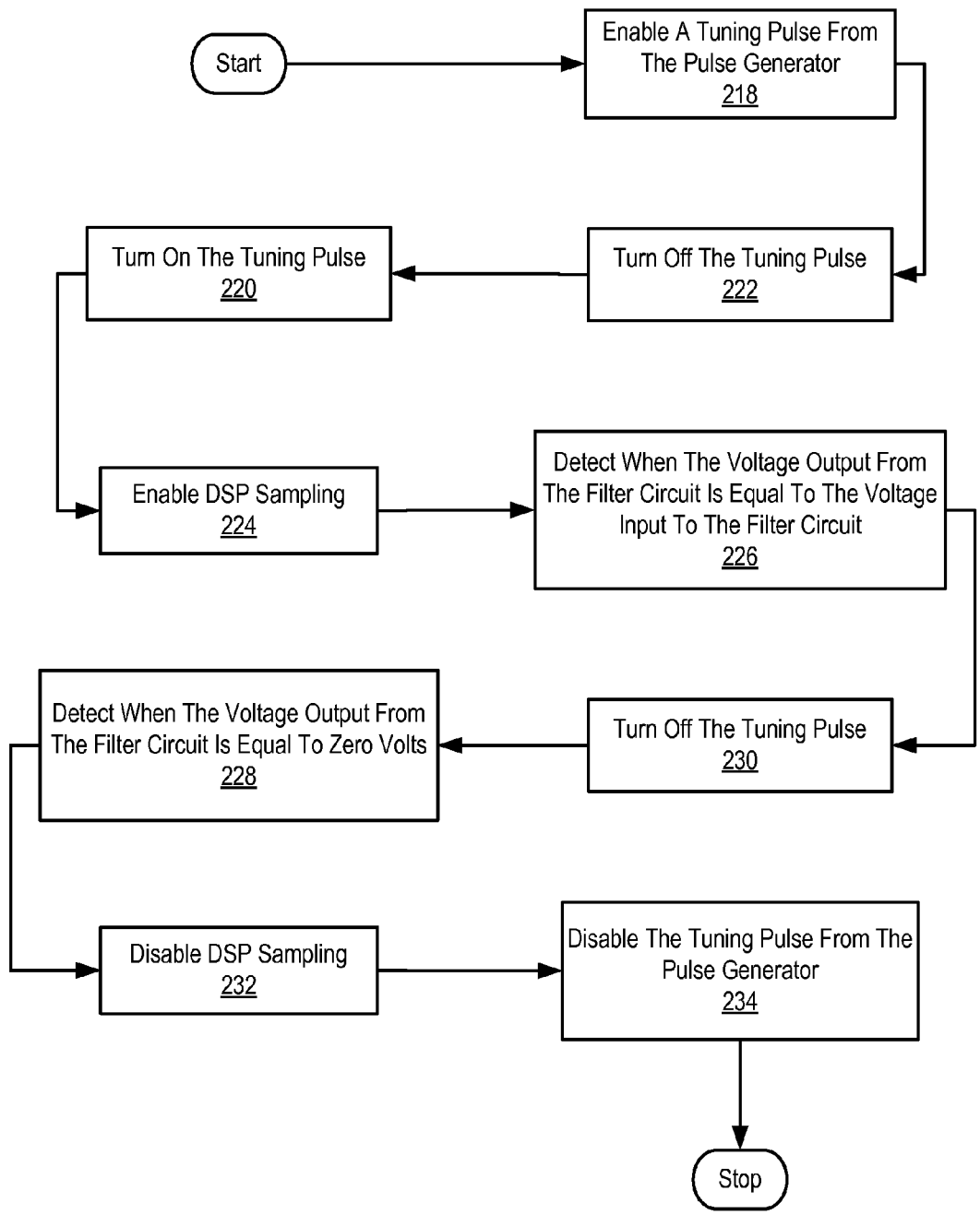
FIG. 4 sets forth a flow chart illustrating an example method of controlling a switching power supply by a tuning control circuit for purposes of tuning the power supply according to embodiments of the present invention.

As mentioned, the tuning of switching power supplies according to embodiments of the present invention typically may be carried out under the overall control of a tuning control circuit. For further explanation, FIG. 4 sets forth a flow chart illustrating an example method of controlling a switching power supply by a tuning control circuit for purposes of tuning the power supply according to embodiments of the present invention. The method of FIG. 4 is explained with reference both to FIG. 4 and also to FIG. 1. The method of FIG. 4, like the methods of FIGS. 2 and 3, is implemented in apparatus similar to that illustrated in FIG. 1, a switching power supply (100) that includes at least one switching transistor (T1), with a filter circuit (101) disposed between the switching transistor and the output (130) of the power supply, where the filter circuit has a design impedance. A pulse generator (108) drives the switching transistor, and a programmable filter (102) is connected to the output of the filter circuit. A digital signal processor ('DSP') (104) is connected to the output of the filter circuit, and the digital signal processor is configured to program the programmable filter. A tuning control circuit (106) is connected to the output of the filter circuit, to the pulse generator, and to the digital signal processor. The example method of FIG. 4 is carried out by the tuning control circuit (106).

The method of FIG. 4 includes enabling (218) a tuning pulse from the pulse generator. The tuning control circuit enables the tuning pulse by activating the tuning operations control line (109), which turns off the normal pulse stream from the pulse generator and enables pulse control on the tuning pulse control line (110). To prepare the filter to receive the tuning pulse, the tuning control circuit turns off (220) the tuning pulse, grounding TP1 and therefore TP2. The tuning circuit then turns on (222) the tuning pulse, rapidly driving TP1 to $V_i$ and eventually driving TP2 to $V_i$ through the filter circuit (101).

Activating the tuning operations control line also enables (224) DSP sampling of the filter circuit output at TP2. The tuning control circuit (106) detects (226) when the voltage output at TP2 from the filter circuit is equal to the voltage input to the filter circuit, $V_i$. When the voltage output at TP2 from the filter circuit is equal to the voltage input to the filter circuit, the tuning control circuit turns off (230) the tuning pulse by deactivating the tuning pulse control line (110). DSP sampling continues. The tuning control circuit detects (228) when the, now falling, voltage output from the filter circuit is equal to zero volts and then disables (232) DSP sampling and also disables (234) the tuning pulse from the pulse generator. Deactivating the tuning operations control line (109) both disables (232) DSP sampling and also disables (234) the tuning pulse from the pulse generator.

In view of the explanations set forth above, readers will recognize that the benefits of tuning a switching power supply according to embodiments of the present invention include the following: Implemented periodically, such as, for example, whenever power is applied to the switching power supply, tuning a switching power supply according to embodiments of the present invention allows the power supply filter setting to change as the circuit ages and degrades over time—and also allows wider tolerance, less expensive parts to be used in the original manufacture of the power supply and also in providing replacement parts over the useful life of the power supply.

Exemplary embodiments of the present invention are described largely in the context of a fully functional, tunable switching power supply. Readers of skill in the art will recognize, however, that the present invention also may be embodied in a computer program product disposed on computer readable, signal bearing media for use with any suitable data processing system. Such signal bearing media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web as well as wireless transmission media such as, for example, networks implemented according to the IEEE 802.11 family of specifications. Persons skilled in the art will immediately recognize that any computer system, microcontroller or microprocessor, for example, having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of tuning a switching power supply, the power supply comprising:
at least one switching transistor; a filter circuit disposed between the switching transistor and the output of the power supply, the filter circuit having a design impedance; a pulse generator that drives the switching transistor; a programmable filter connected to the output of the filter circuit; a digital signal processor ('DSP') connected to the output of the filter circuit, the DSP configured to program the programmable filter; and a tuning control circuit connected to the output of the filter circuit, to the pulse generator, and to the DSP;
the method comprising:
calculating by the DSP, from sampled voltage values of a tuning pulse driven through the filter circuit by the pulse generator, the actual impedance of the filter circuit; and
programming, by the DSP, the programmable filter, setting the combined impedance of the filter circuit and the programmable filter to the design impedance of the filter circuit.

2. The method of claim 1 further comprising configuring the digital signal processor with the design impedance of the filter circuit.

3. The method of claim 1 further comprising:
driving by the pulse generator the tuning pulse through the switching transistor into the filter circuit;
sampling by the DSP voltage values of the tuning pulse as output from the filter circuit; and
deriving by the DSP, in dependence upon the actual impedance of the filter circuit and the design impedance of the filter circuit, a tuning impedance;
wherein programming the programmable filter further comprises programming the programmable filter with the tuning impedance.

4. The method of claim 1 further comprising controlling tuning of the power supply by the tuning control circuit, including:
enabling a tuning pulse from the pulse generator;
turning off the tuning pulse;
turning on the tuning pulse;
enabling DSP sampling;
detecting when the voltage output from the filter circuit is equal to the voltage input to the filter circuit;
turning off the tuning pulse;
detecting when the voltage output from the filter circuit is equal to zero volts;
disabling DSP sampling; and
disabling the tuning pulse from the pulse generator.

5. The method of claim 1 wherein:
the operating load of the power supply presents a complex impedance;
the tuning control circuit is operably connected to a switch that is connected in series with the operating load; and
the method further comprises switching, by the tuning control circuit, the operating load to a resistive tuning load before tuning the power supply.

6. Apparatus for tuning a switching power supply, the apparatus comprising the power supply, the apparatus further comprising:
at least one switching transistor; a filter circuit disposed between the switching transistor and the output of the power supply, the filter circuit having a design impedance; a pulse generator that drives the switching transistor; a programmable filter connected to the output of the filter circuit; a digital signal processor ('DSP') connected to the output of the filter circuit, the DSP configured to program the programmable filter; and a tuning control circuit connected to the output of the filter circuit, to the pulse generator, and to the DSP;

the apparatus configured to be capable of:

calculating by the DSP, from sampled voltage values of a tuning pulse driven through the filter circuit by the pulse generator, the actual impedance of the filter circuit; and programming, by the DSP, the programmable filter, setting the combined impedance of the filter circuit and the programmable filter to the design impedance of the filter circuit.

7. The apparatus of claim 6 further comprising the digital signal processor configured with the design impedance of the filter circuit.

8. The apparatus of claim 6 further configured to be capable of:

driving by the pulse generator the tuning pulse through the switching transistor into the filter circuit;

sampling by the DSP voltage values of the tuning pulse as output from the filter circuit; and deriving by the DSP, in dependence upon the actual impedance of the filter circuit and the design impedance of the filter circuit, a tuning impedance;

wherein programming the programmable filter further comprises programming the programmable filter with the tuning impedance.

9. The apparatus of claim 6 further comprising the tuning control circuit configured to be capable of controlling the tuning of the power supply, such controlling of the tuning of the power supply further comprising:

enabling a tuning pulse from the pulse generator;
turning off the tuning pulse;
turning on the tuning pulse;
enabling DSP sampling;
detecting when the voltage output from the filter circuit is equal to the voltage input to the filter circuit;
turning off the tuning pulse;
detecting when the voltage output from the filter circuit is equal to zero volts;
disabling DSP sampling; and
disabling the tuning pulse from the pulse generator.

10. The apparatus of claim 6 wherein:
the operating load of the power supply presents a complex impedance;
the tuning control circuit is operably connected to a switch that is connected in series with the operating load; and
the tuning control circuit is configured to be capable of switching the operating load to a resistive tuning load before tuning the power supply.

11. A computer program product for tuning a switching power supply, the power supply comprising:

at least one switching transistor; a filter circuit disposed between the switching transistor and the output of the power supply, the filter circuit having a design impedance; a pulse generator that drives the switching transistor; a programmable filter connected to the output of the filter circuit; a digital signal processor ('DSP') connected to the output of the filter circuit, the DSP configured to program the programmable filter; and a tuning control circuit connected to the output of the filter circuit, to the pulse generator, and to the DSP;

the computer program product disposed in a computer readable, signal bearing medium, the computer program product comprising computer program instructions capable of causing the apparatus to operate by:

calculating by the DSP, from sampled voltage values of a tuning pulse driven through the filter circuit by the pulse generator, the actual impedance of the filter circuit; and programming, by the DSP, the programmable filter, setting the combined impedance of the filter circuit and the programmable filter to the design impedance of the filter circuit.

12. The computer program product of claim 11 wherein the signal bearing medium comprises a recordable medium.

13. The computer program product of claim 11 wherein the signal bearing medium comprises a transmission medium.

14. The computer program product of claim 11 wherein the digital signal processor is configured with the design impedance of the filter circuit.

15. The computer program product of claim 11 further comprising computer program instructions capable of causing the apparatus to operate by:

driving by the pulse generator the tuning pulse through the switching transistor into the filter circuit;

sampling by the DSP voltage values of the tuning pulse as output from the filter circuit; and deriving by the DSP, in dependence upon the actual impedance of the filter circuit and the design impedance of the filter circuit, a tuning impedance;

wherein programming the programmable filter further comprises programming the programmable filter with the tuning impedance.

16. The computer program product of claim 11 further comprising computer program instructions capable of causing the apparatus to operate by controlling the tuning of the power supply by the tuning control circuit, the controlling of the tuning including:

enabling a tuning pulse from the pulse generator;
turning off the tuning pulse;
turning on the tuning pulse;
enabling DSP sampling;
detecting when the voltage output from the filter circuit is equal to the voltage input to the filter circuit;
turning off the tuning pulse;
detecting when the voltage output from the filter circuit is equal to zero volts;
disabling DSP sampling; and
disabling the tuning pulse from the pulse generator.

17. The computer program product of claim 11 wherein:
the operating load of the power supply presents a complex impedance;
the tuning control circuit is operably connected to a switch that is connected in series with the operating load; and
the computer program product further comprises computer program instructions capable of causing the tuning control circuit to switch the operating load to a resistive tuning load before tuning the power supply.

* * * * *